United States Patent
Tian

(10) Patent No.: US 10,145,610 B2
(45) Date of Patent: Dec. 4, 2018

(54) AUTOMATIC VACUUM DRYING DEVICE

(71) Applicant: SHENZHEN TIME HIGH-TECH EQUIPMENT CO., LTD, Shenzhen (CN)

(72) Inventor: Hanrong Tian, Shenzhen (CN)

(73) Assignee: SHENZHEN TIME HIGH-TECH EQUIPMENT CO., LTD, Shenzhen (CN)

(*) Notice: Subject to any disclaimer, the term of this patent is extended or adjusted under 35 U.S.C. 154(b) by 280 days.

(21) Appl. No.: 15/026,984

(22) PCT Filed: Jan. 28, 2015

(86) PCT No.: PCT/CN2015/071677
§ 371 (c)(1),
(2) Date: Apr. 3, 2016

(87) PCT Pub. No.: WO2016/045289
PCT Pub. Date: Mar. 31, 2016

(65) Prior Publication Data
US 2016/0258681 A1    Sep. 8, 2016

(30) Foreign Application Priority Data

Sep. 25, 2014    (CN) .......................... 2014 1 0494112

(51) Int. Cl.
*F26B 13/30*    (2006.01)
*F26B 5/04*    (2006.01)
(Continued)

(52) U.S. Cl.
CPC ................ *F26B 5/042* (2013.01); *F26B 5/04* (2013.01); *F26B 7/00* (2013.01); *F26B 15/12* (2013.01);
(Continued)

(58) Field of Classification Search
CPC .. F26B 5/042; F26B 5/04; F26B 21/14; F26B 25/12
(Continued)

(56) References Cited

FOREIGN PATENT DOCUMENTS

| CN | 201456295 U | 5/2010 |
| CN | 202304265 U | 7/2012 |

(Continued)

OTHER PUBLICATIONS

International Publication for PCT/CN2015/071677.
International Search Report for PCT/CN2015/071677.

*Primary Examiner* — John McCormack

(57) ABSTRACT

An automatic vacuum drying device comprises a drying oven, a heating device used to heat the drying oven, a vacuum extraction device used to evacuate the drying oven, a nitrogen input device used to input nitrogen into the drying oven, and a transporting device located inside the drying oven and used to transport materials, two first openings are located at two opposite sides of the drying oven, an automatic sealing door is mounted on at least one of the first openings, the automatic sealing door includes a first door plank and a second door plank parallel to the first door plank, an elevator structure is located between the first door plank and the second door plank, the elevator structure is used to lift the first door plank and the second door plank. The automatic vacuum drying devices can form an automatic vacuum drying production line conveniently, and the automatic vacuum drying production line has high degree of automation, and high processing efficiency, such that it is possible to drastically improve the vacuum drying efficiency.

10 Claims, 4 Drawing Sheets

(51) Int. Cl.
*F26B 7/00* (2006.01)
*F26B 15/12* (2006.01)
*F26B 25/12* (2006.01)
*F26B 21/14* (2006.01)
*F26B 23/06* (2006.01)
*H01G 11/84* (2013.01)
*H01G 13/04* (2006.01)
*H01M 10/0525* (2010.01)
*H01M 10/058* (2010.01)
*H01M 10/04* (2006.01)
*H01M 10/052* (2010.01)

(52) U.S. Cl.
CPC .............. *F26B 21/14* (2013.01); *F26B 23/06* (2013.01); *F26B 25/12* (2013.01); *H01G 11/84* (2013.01); *H01G 13/04* (2013.01); *H01M 10/04* (2013.01); *H01M 10/052* (2013.01); *H01M 10/058* (2013.01); *H01M 10/0525* (2013.01)

(58) Field of Classification Search
USPC ....... 34/92, 284, 242; 49/236–245, 254–258, 49/260; 110/173; 126/191, 192
See application file for complete search history.

(56) References Cited

FOREIGN PATENT DOCUMENTS

| | | |
|---|---|---|
| CN | 202495364 U | 10/2012 |
| CN | 103452444 A | 12/2013 |
| CN | 204214220 U | 3/2015 |
| EP | 1314521 A1 | 5/2003 |

AUTOMATIC VACUUM DRYING DEVICE

TECHNICAL FIELD

The present invention relates to an automatic vacuum drying device, especially relates to an automatic vacuum drying device which can form an automatic vacuum drying production line conveniently, and the automatic vacuum drying production line has high degree of automation, and high processing efficiency.

BACKGROUND ART

A vacuum drying process is an important producing process during the electronic components manufacturing processing. The vacuum drying process can reduce water contained in the electronic components, such that the electronic components can meet the using requirement. The vacuum drying process is mainly applied to the manufacturing processes of the electronic components, especially applied to the manufacturing processes of the supercapacitor or the manufacturing processes of the lithium battery. The traditional vacuum drying device mainly includes a single vacuum drying oven, and electronic components needed to be dried are transported to the vacuum drying device through a material car, the traditional vacuum drying device is poor in processing efficiency, and cannot control the dry humidity and the temperature maintain highly uniform in vacuum condition. A plurality of vacuum drying devices having accesses corresponding to each other can form a vacuum drying system which can continuously process, the vacuum drying devices can be set different vacuum degrees, drying temperatures, and drying times to overcome the above defects existed in the single vacuum drying device. However, how to realize seamless connections among the vacuum drying devices is always a difficult problem, one solution solve this problem is setting automatic air-tight doors on the vacuum drying devices, such that the vacuum drying devices can be connected with each other seamlessly, however, the traditional vacuum drying devices cannot solve the problem. Now an automatic vacuum drying device which can form an automatic vacuum drying production line conveniently is in need, and the automatic vacuum drying production line has high degree of automation, and high processing efficiency.

SUMMARY OF INVENTION

The technical problem to be solved by the present invention is to provide an automatic vacuum drying device which can form an automatic vacuum drying production line conveniently, and the automatic vacuum drying production line has high degree of automation, and high processing efficiency.

In order to solve the above problem, the present invention provides an automatic vacuum drying device, which comprises a drying oven, a heating device used to heat the drying oven, a vacuum extraction device used to evacuate the drying oven, a nitrogen input device used to input nitrogen into the drying oven, and a transporting device located inside the drying oven and used to transport materials, the key is that two first openings are located at two opposite sides of the drying oven, an automatic sealing door is mounted on at least one of the first openings, the automatic sealing door includes a first door plank and a second door plank parallel to the first door plank, an elevator structure is located between the first door plank and the second door plank, the elevator structure is used to lift the first door plank and the second door plank, at least two articulation elements are located between the first door plank and the elevator structure, one end of each articulation element is connected with the first door plank, an opposite end of each articulation element is connected with the elevator structure, at least two another articulation elements are also located between the second door plank and the elevator structure, one end of each another articulation element is connected with the second door plank, an opposite end of each another articulation element is connected with the elevator structure, a first roller is located at a bottom of the first door plank, a first slant surface with left higher than right is located bellow the first roller, a second roller is located at a bottom of the second door plank, a second slant surface with left higher than right is located bellow the second roller.

As a first improvement of the invention, the transporting device includes a plurality of second gears located in the drying oven, a geometry axis of each second gear is parallel to a bottom surface of the drying oven and a plane of the first openings simultaneously, the second gears are driven by a motor.

As a second improvement of the invention, the automatic vacuum drying device further includes a plurality of guided ways located in the drying oven, the guided ways are perpendicular to the plane of the first openings.

As a third improvement of the invention, the heating device includes a plurality of heating bodies located at an outside of the drying oven, each heating body includes an aluminum main body and a heating element located inside the aluminum main body.

As a further improvement of the invention, the aluminum main body includes a plate and a cover attached with the plate, a groove is located on the plate, the heating element is located in the groove.

As a forth improvement of the invention, the automatic vacuum drying device further includes a guided rail which is parallel to the rack, the rack further has a plurality of guided rollers corresponding to the guided rail.

As a further improvement of the invention, a left side of the first door plank has a sealant tape, a right side of the second door plank also has another sealant tape.

As a fifth improvement of the invention, a side surface of the automatic vacuum drying device having the first opening and sealed by the automatic sealing door further has a cavity used to receive the first door plank, the second door plank and the elevator structure, two second openings are formed on two opposite sides of the cavity, one second opening closing to the drying oven is connected with one first opening formed on the drying oven and closing to the cavity.

As a further improvement of the invention, when the first door plank and the second door plank are driven by the elevator structure to move down to a limit position, the first door plank and the second door plank resist tightly on two second openings from an inner side of the cavity respectively.

As a further improvement of the invention, the elevator structure includes a rack and a first gear corresponding to the rack, the first door plank and the second door plank are both connected with the rack through the articulation elements, the first gear is driven by a motor.

The advantage of the present invention:

An automatic vacuum drying device comprises a drying oven, a heating device used to heat the drying oven, a vacuum extraction device used to evacuate the drying oven, a nitrogen input device used to input nitrogen into the drying oven, and a transporting device located inside the drying oven and used to transport materials, two first openings are located at two opposite sides of the drying oven, an automatic sealing door is mounted on at least one of the first openings, the automatic sealing door includes a first door plank and a second door plank parallel to the first door plank, an elevator structure is located between the first door plank and the second door plank, the elevator structure is used to lift the first door plank and the second door plank, at least two articulation elements are located between the first door plank and the elevator structure, one end of each articulation element is connected with the first door plank, an opposite end of each articulation element is connected with the elevator structure, at least two another articulation elements are also located between the second door plank and the elevator structure, one end of each another articulation element is connected with the second door plank, an opposite end of each another articulation element is connected with the elevator structure, a first roller is located at a bottom of the first door plank, a first slant surface with left higher than right is located bellow the first roller, a second roller is located at a bottom of the second door plank, a second slant surface with left higher than right is located bellow the second roller. The elevator structure can drive the first door plank and the second door plank to move down when the elevator structure descends, the first roller moves downward along the first slant surface, and the second roller moves downward along the second slant surface simultaneously, the first door plank will move toward a processing equipment which can be regarded as a previous process of the automatic sealing door and resist an opening of the processing equipment, the second door plank will move towards one second opening having the automatic sealing door and finally resist on the second opening, such that, the opening of the processing equipment which is the previous process of the automatic sealing door is sealed, and the second opening having the automatic sealing door is also sealed, the working process of opening the automatic sealing door is opposite to the working process of closing the automatic sealing door. Such that the first openings of a plurality of automatic vacuum drying devices can be docked to form the automatic vacuum drying production line, the transporting device can be used to transport materials among the automatic vacuum drying devices, the vacuum extraction device is used to evacuate the drying oven, the nitrogen input device is used to input nitrogen into the drying oven after the drying oven is evacuate, then the heating device starts to dry materials located inside the drying oven. The automatic vacuum drying devices can be set different vacuum degrees, drying temperatures, and drying times, such that automatic vacuum drying devices can drying efficiently, and and control the dry humidity and the temperature maintain highly uniform in vacuum condition. The side surface of the automatic vacuum drying device having the first opening sealed by the automatic sealing door further has the cavity used to receive the first door plank, the second door plank and the elevator structure, two second openings are formed on two opposite sides of the cavity, one second opening closing to the drying oven is connected with one first opening formed on the drying oven and closing to the cavity, the above structure can omit a distance between the automatic sealing door and the opening of the processing equipment used in the previous process, the second opening of the cavity far away the drying oven is directly connected with the opening of the processing equipment used in the previous process, there is no need to set a cover to be coiled around the automatic sealing door to ensure the vacuum degree of the automatic vacuum drying device, the cavity is separated from the outside to ensure the vacuum degree of the automatic vacuum drying device, and when the automatic sealing door is opened, the vacuum degree of the automatic vacuum drying device is not affected, such that the automatic vacuum drying device avoids vacuuming and inputting nitrogen again, to save energy and improve efficiency. When the elevator structure drives the first door plank and the second door plank to move down to the limit position, the first door plank and the second door plank resist the two second openings from the inner side of the cavity respectively, a working mode which is defined as one elevator structure drives the first door plank and the second door plank, another working mode which can be defined as one elevator structure drives one door plank, the working mode of the present invention saves one elevator system, that is, only one elevator system can seal two openings, such that the structure is simple and the cost is reduced. The elevator structure includes the rack and the first gear corresponding to the rack, the first door plank and the second door plank are connected with the rack through the articulation elements, the first gear is driven by motor, the driving mode can not only provide enough pressing force to ensure that the first door plank and the second door plank can be tightly attached with the second openings respectively, the driving mode can be operated stably under high temperature. The automatic vacuum drying device further includes a guided rail which is parallel to the rack, the rack further has a plurality of guided rollers corresponding to the guided rail, the guided rail and the guided rollers can ensure that the first door plank and the second door plank always move up and down straightly, such that when the first door plank and the second door plank attach with the second openings, the first door plank always parallels to the second door plank, no angle can be existed between the first door plank and the second door plank, such that the first door plank and the second door plank can be tightly attached with the second openings to ensure the sealing effect of the drying oven, and improve the effect of the vacuum drying. The left side of the first door plank has sealant tape, the right side of the second door plank also has sealant tape, the sealant tapes can ensure that when the first door plank closes with the second door plank, the first door plank and the second door plank can attach with the second openings more tightly, such that the inner of the drying oven can be completely separated from the outside to improve the vacuum drying effect. The heating device includes a plurality of heating bodies located at the outside of the drying oven, each heating body includes an aluminum main body and a heating element located inside the aluminum main body the aluminum main body includes the plate and the cover attached with the plate, the groove is located on the plate, the heating element is located in the groove. The heating device is easy to be installed and repaired, and the heating efficiency and the heating uniformity are both good. The transporting device includes a plurality of second gears located in the drying oven, the geometry axis of each second gear is parallel to the bottom surface of the drying oven and the plane of the first openings simultaneously, the second gears are driven by a motor, the automatic vacuum drying device further includes a plurality of guided ways located in the drying oven, the guided ways are perpendicular to the plane of the first openings, the rack corresponding to the second gears is located at the bottom of the material car, the rolling of the gears can drive the material car to move in the drying oven, such that the materials can be transported among the automatic vacuum drying device, the bottom of the material car has guided rollers corresponding to the guided rail, such that the material car can run stably, and would not contact with the inner wall of the drying oven, and when the automatic vacuum drying devices form the e automatic vacuum drying producing lines, the material car can move smoothly through the automatic vacuum drying devices by aligning the guided rails.

DESCRIPTION OF EMBODIMENTS

Figure 1:
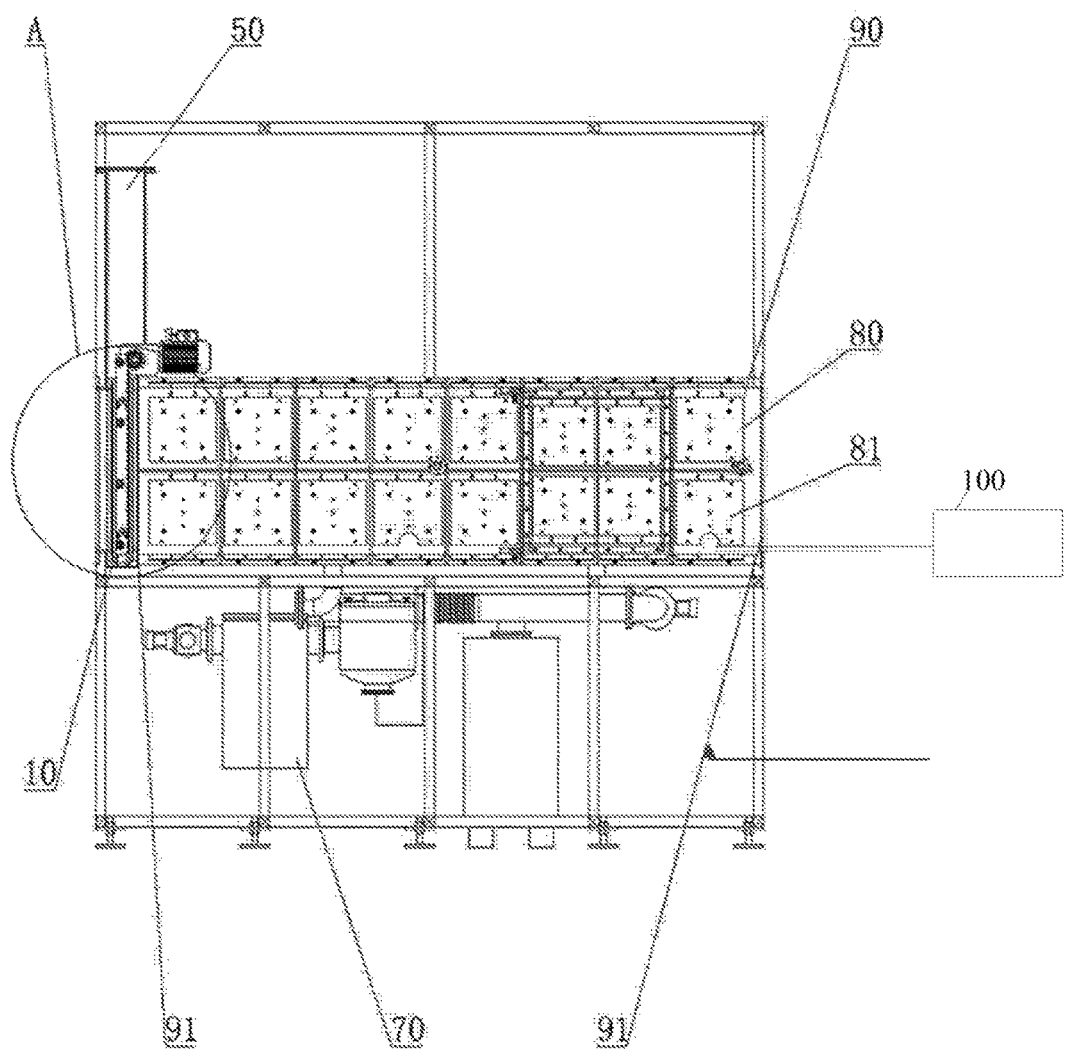
FIG. 1 is an isometric view of an automatic vacuum drying device.
Figure 2:
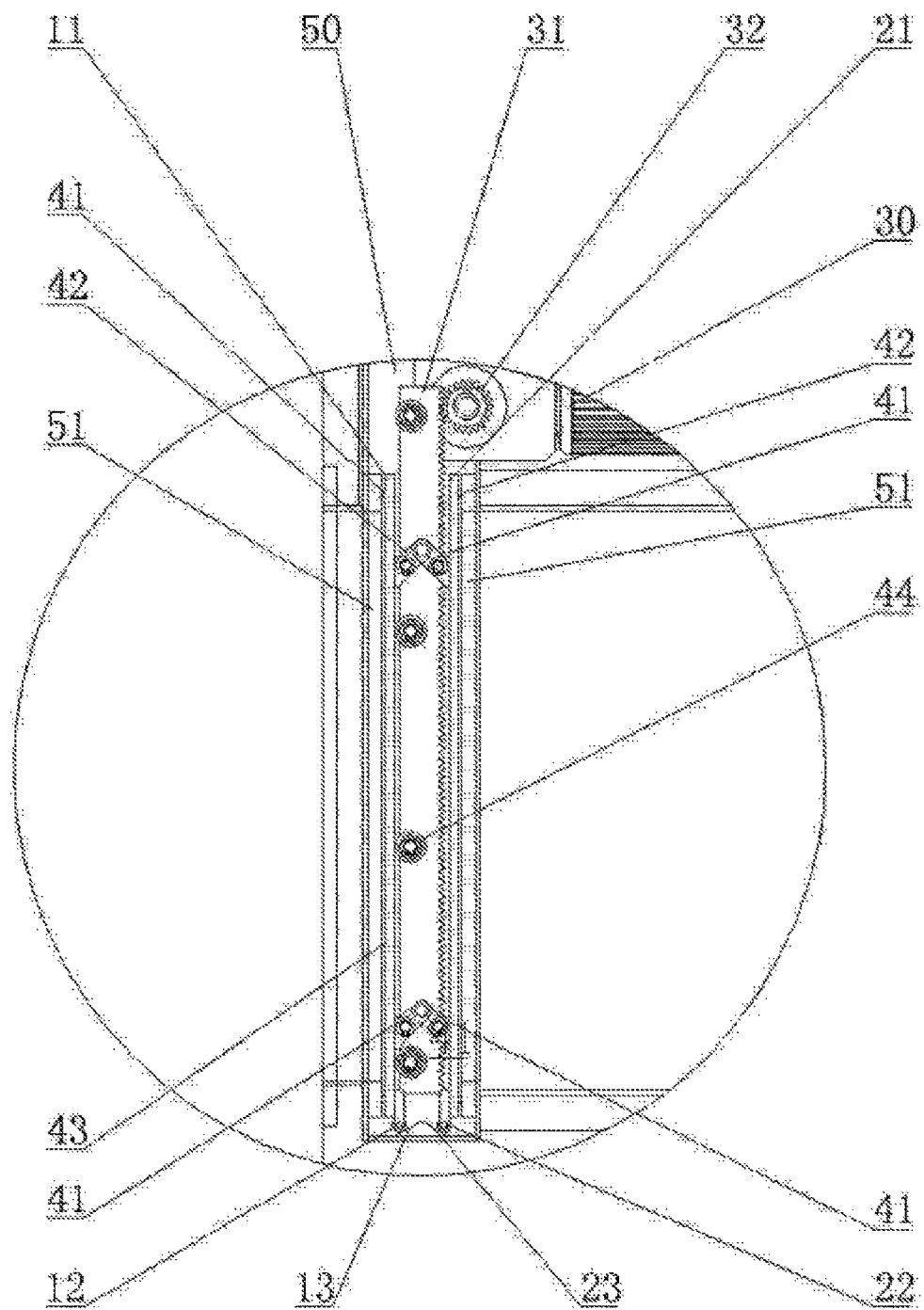
FIG. 2 is an enlarge view of A shown in FIG. 1.
Figure 3:
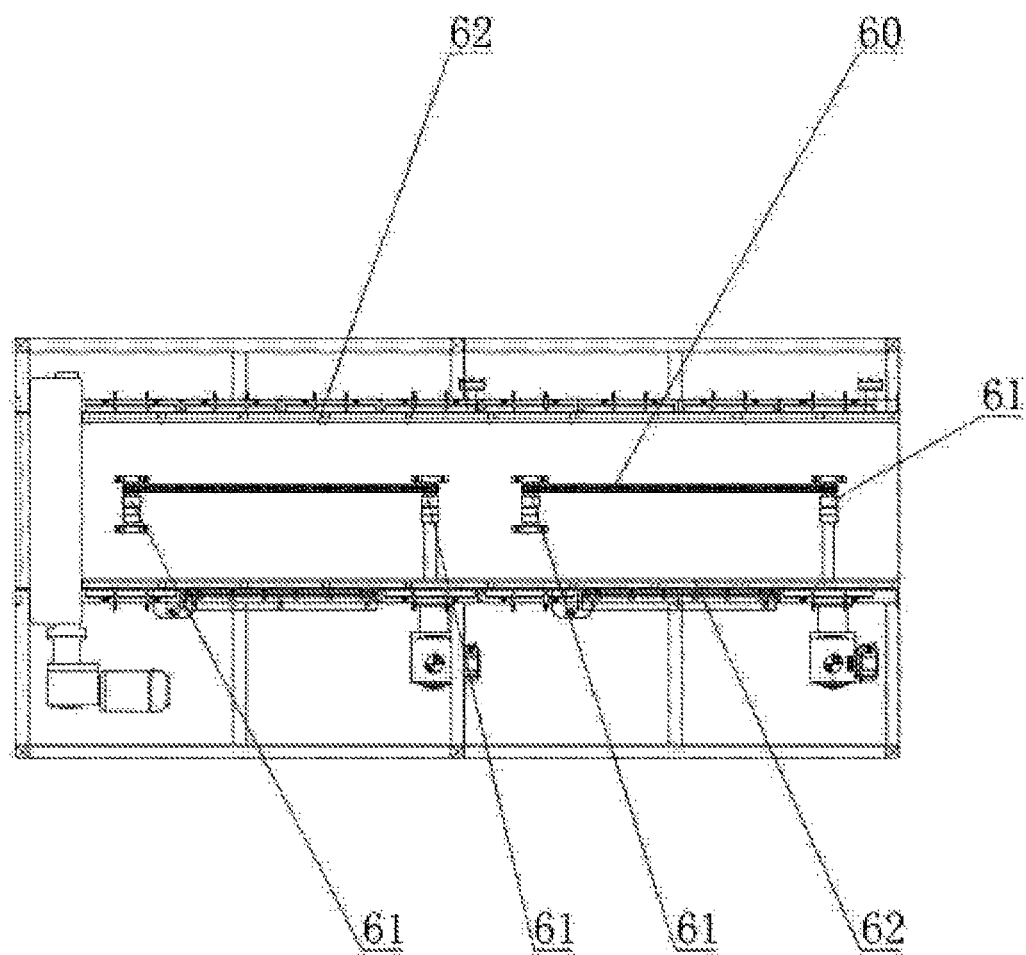
FIG. 3 is an isometric view of a bottom of a drying case.

Referring to FIGS. 1-3, an automatic vacuum drying device, includes a drying oven 90, a heating device 80 used to heat the drying oven 90, a vacuum extraction device 70 used to evacuate the drying oven 90, a nitrogen input device used to input nitrogen into the drying oven 90, a transporting device 60 located inside the drying oven 90 and used to transport materials. And the heating device 80 can be a heating plate which includes an aluminium plate and at least one electric heating pipe located in the aluminium plate, then the heating plate can cover an outside of the drying oven 90; the heating device 80 can also be another heating plate which includes another aluminium plate and at least one far infrared heating pipe located in the another aluminium plate, the the another heating plate can cover the outside of the drying oven 90; at the same time, the heating device 80 can also be a heating plate which includes an aluminium plate and at least one high temperature electric heating wire located in the aluminium plate, then the heating plate having the high temperature electric heating wire can cover the outside of the drying oven 90. At least one exemplary embodiment, the heating device 80 is the heating plate which includes the aluminium plate and the electric heating pipe located in the aluminium plate, then the heating plate covers the outside of the drying oven 90. The vacuum extraction device 70 can just be a vacuum pump, or the vacuum extraction device 70 can be composed of the vacuum pump, a filter and/or a roots pump, and the filter can be a dry ice filter or a oil and gas filter. In at least one exemplary embodiment, the vacuum extraction device 70 can be composed of the vacuum pump and the oil and gas filter. The transporting device 60 can be a conveyer belt, a conveyer roller, or a material car having rack located at a bottom of the material car, the material can be driven by gear located in the drying oven 90. In at least one exemplary embodiment, the transporting device 60 can be the material car having rack located at the bottom of the material car, the material can be driven by the gear located in the drying oven 90, the transporting device 60 includes a plurality of second gears 61, a geometry axis of each second gear 61 is parallel to a bottom surface of the drying oven 90 and a plane of first openings 91 simultaneously, the second gears 61 are driven by a motor. The automatic vacuum drying device further includes a plurality of guided ways 62 located in the drying oven 90, the guided ways 62 are perpendicular to the plane of the first openings 91. Two first openings 91 are located at two opposite sides of the drying oven 90, an automatic sealing door 10 is mounted on at least one of the first openings 91, the automatic sealing door 10 includes a first door plank 11 and a second door plank 21 parallel to the first door plank 11, an elevator structure 30 is located between the first door plank 11 and the second door plank 21, the elevator structure 30 is used to lift the first door plank 11 and the second door plank 21, at least two articulation elements 41 are located between the first door plank 11 and the elevator structure 30, one end of each articulation element 41 is connected with the first door plank 11, an opposite end of each articulation element 41 is connected with the elevator structure 30, at least two another articulation elements 41 are also located between the second door plank 21 and the elevator structure 30, one end of each another articulation element 41 is connected with the second door plank 21, an opposite end of each another articulation element 41 is connected with the elevator structure 30, a first roller 12 is located at a bottom of the first door plank 11, a first slant surface 13 with left higher than right is located bellow the first roller 12, a second roller 22 is located at a bottom of the second door plank 21, a second slant surface 23 with left higher than right is located bellow the second roller 22. A side surface of the automatic vacuum drying device having the first opening 91 further has a cavity 50 used to receive the first door plank 11, the second door plank 21 and the elevator structure 30, two second openings 51 are formed on two opposite sides of the cavity 50, one second opening 51 closing to the drying oven 90 is connected with one first opening 91 formed on the drying oven 90 and closing to the cavity 50, the connecting way not only includes the second opening 51 is connected with the first opening 91 through a channel, but also includes the second opening 51 overlaps with the first opening 91, that is, the second opening 51 is the first opening 91 simultaneously. When the elevator structure 30 drives the first door plank 11 and the second door plank 21 to move down to a limit position, the first door plank 11 and the second door plank 21 resist the two second openings 51 from an inner side of the cavity 50 respectively. The elevator structure 30 includes the rack 31 and a first gear 32 corresponding to the rack 31, the first door plank 11 and the second door plank 21 are connected with the rack 31 through the articulation elements 41, the first gear 32 is driven by the motor. A guided rail 43 is parallel to the rack 31, the rack 31 further has a plurality of guided rollers 44 corresponding to the guided rail 43. A left side of the first door plank 11 has a sealant tape 42, a right side of the second door plank 21 also has another sealant tape 42.

Figure 4:
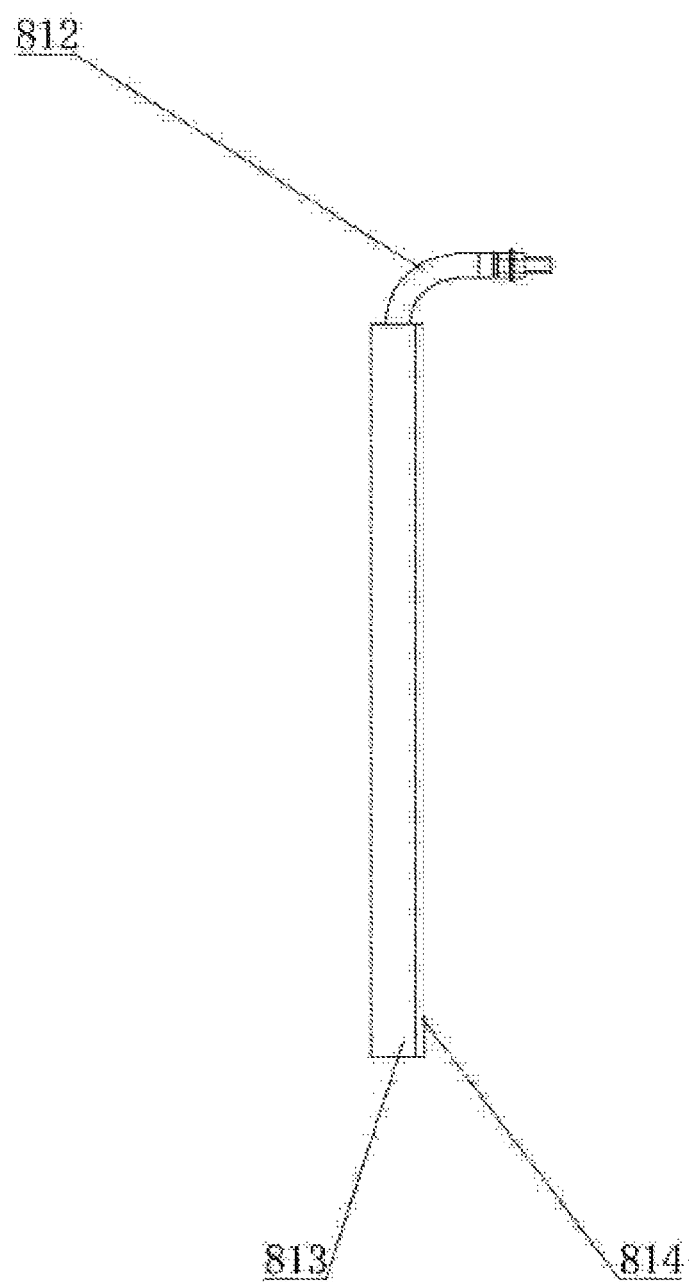
FIG. 4 is an isometric view of a heating body.

Referring to FIGS. 1 and 4 the heating device 80 includes a plurality of heating bodies 81, each heating body 81 includes an aluminum main body 811 and a heating element 812 located inside the aluminum main body 811. The aluminum main body 811 includes a plate 813 and a cover 814 attached with the plate 813, a groove 815 is located on the plate 813, the heating element 812 is located in the groove 815.

It must be pointed out that, example embodiments have been described hereinabove regarding the automatic vacuum drying device, however the invention is not limited to the above example embodiments. Various modifications to and departures from the disclosed example embodiments will occur to those having ordinary skill in the art. The subject matter that is intended to be within the spirit of this disclosure is set forth in the following claims.

The invention claimed is:
1. An automatic vacuum drying device, comprising a drying oven (90), a heating device (80) used to heat the drying oven (90), a vacuum extraction device (70) used to evacuate the drying oven (90), a nitrogen input device used to input nitrogen into the drying oven (90), and a transporting device (60) located inside the drying oven (90) and used to transport materials, two first openings (91) being located at two opposite sides of the drying oven (90), an automatic sealing door (10) being mounted on at least one of the first openings (91), the automatic sealing door (10) including a first door plank (11) and a second door plank (21) parallel to the first door plank (11), an elevator structure (30) being located between the first door plank (11) and the second door plank (21), the elevator structure 30 being used to lift the first door plank (11) and the second door plank (21), at least two articulation elements (41) being located between the first door plank (11) and the elevator structure (30), one end of each articulation element (41) being connected with the first door plank (11), an opposite end of each articulation element (41) being connected with the elevator structure (30), at least two articulation elements (41) being located between the second door plank (21) and the elevator structure (30), one end of each articulation element (41) being connected with the second door plank (21), an opposite end of each articulation element (41) being connected with the elevator structure (30), a first roller (12) being located at a bottom of the first door plank (11), a first slant surface (13) being located below the first roller (12) and a left end of the first slant surface (13) is higher than a right end of the first slant surface (13), a second roller (22) being located at a bottom of the second door plank (21), a second slant surface (23) being located below the second roller (22) and a left end of the second slant surface (23) is lower than a right end of the second slant surface (23).

2. The automatic vacuum drying device as set forth in claim 1, wherein a side surface of the first opening (91) having the automatic sealing door (10) has a cavity (50) used to receive the first door plank (11), the second door plank (21) and the elevator structure (30), two second openings (51) are formed on two opposite sides of the cavity (50), one second opening (51) closing to the drying oven (90) is connected with one first opening (91) formed on the drying oven and closing to the cavity (50).

3. The automatic vacuum drying device as set forth in claim 2, wherein when the elevator structure (30) drives the first door plank (11) and the second door plank (21) to move down to a limit position, the first door plank (11) and the second door plank (21) resist on the two second openings (51) from an inner side of the cavity (50) respectively.

4. The automatic vacuum drying device as set forth in claim 3, wherein the elevator structure (30) includes a rack (31) and a first gear (32) corresponding to the rack (31), the first door plank (11) and the second door plank (21) both be connected with the rack (31) through the articulation elements (41), the first gear (32) is driven by a motor.

5. The automatic vacuum drying device as set forth in claim 4, wherein the automatic vacuum drying device further includes a guided rail (43) which is parallel to a rack (31), the rack (31) has a plurality of guided rollers 44 corresponding to the guided rail (43).

6. The automatic vacuum drying device as set forth in claim 5, wherein a left side of the first door plank (11) has a sealant tape (42), a right side of the second door plank (21) also has another sealant tape (42).

7. The automatic vacuum drying device as set forth in claim 1, wherein the heating device (80) includes a plurality of heating bodies (81) located at an outside of the drying oven (90), each heating body (81) includes an aluminum main body (811) and a heating element (812) located inside the aluminum main body (811).

8. The automatic vacuum drying device as set forth in claim 7, wherein the aluminum main body (811) includes a plate (813) and a cover (814) attached with the plate (813), a groove (815) is located on the plate (813), the heating element (812) is located in the groove (815).

9. The automatic vacuum drying device as set forth in claim 1, wherein the transporting device (60) includes a plurality of second gears (61) located in the drying oven (90), a geometry axis of each second gear (61) is parallel to a bottom surface of the drying oven (90) and a plane of first openings (91) simultaneously, the second gears (61) are driven by a motor.

10. The automatic vacuum drying device as set forth in claim 1, wherein the automatic vacuum drying device further includes a plurality of guided ways (62) located in the drying oven (90), the guided ways (62) are perpendicular to a plane of the first openings (91).

* * * * *